United States Patent Office 2,743,266
Patented Apr. 24, 1956

2,743,266
8-HYDROXYQUINOLINE DISAZO-DYESTUFFS

Hans Liechti, Riehen, and Karl Menzi and Fritz Oesterlein, Basel, Switzerland, assignors to Ciba Limited, Basel, Switzerland, a Swiss firm No Drawing. Application March 3, 1952,
Serial No. 274,654

Claims priority, application Switzerland March 8, 1951

1 Claim. (Cl. 260—155)

This invention provides new disazo-dyestuffs. These dyestuffs, in the form of their free acids, correspond to the general formula (1)
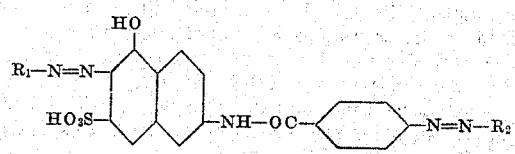

in which $R_1$ represents a benzene radical containing a carboxylic acid amide group and in ortho-position to the azo linkage a hydroxyl group, and $R_2$ represents the radical of an 8-hydroxyquinoline. These disazo-dyestuffs are made in accordance with the invention by coupling a diazo compound of an amino-monoazo-dyestuff of the general formula (2)
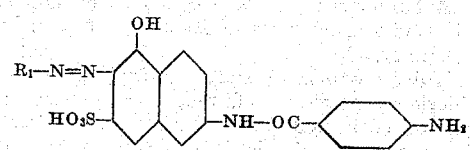

in which $R_1$ represents a benzene radical containing a carboxylic acid amide group and in ortho-position to the azo-linkage a hydroxyl group, with an 8-hydroxyquinoline.

The amino-monoazo-dyestuffs used as starting materials may be prepared by coupling an ortho-hydroxy-diazobenzene carboxylic acid amide with 2-(4'-amino-benzoyl)-amino-5-hydroxynaphthalene-7-sulfonic acid.

As ortho-hydroxy-diazo-benzene carboxylic acid amides there come into consideration, for example, diazo compounds of 1-hydroxy-2-aminobenzene carboxylic acid amides, which contain the carboxylic acid amide group in the 5- or 6-position or advantageously in the 4-position. The benzene nucleus may, if desired, contain further substituents, for example a halogen atom such as bromine or chlorine, or a methyl or nitro group. These 1-hydroxy-2-aminobenzene carboxylic acid amides can be made in known manner from the appropriate 1-hydroxy-2-nitro-benzene carboxylic acids or more especially from the halides of these acids by condensation with ammonia, or a secondary or advantageously a primary amine, followed by reduction of the nitro group.

For the condensation there may be used, for example, the following amines: Ethylamine, diethylamine, butylamine, monoethanolamine, benzylamine, cyclohexylamine, 2-aminothiazole, 1-aminonaphthalene or 2-amino-naphthalene. Of special interest are aromatic amines of the benzene series, for example, alkylphenylamines such as N-methylaminobenzene, but especially primary amines of this kind such as aminobenzene, 2-chloro-1-aminobenzene, 2-methoxy-1-aminobenzene, 4-ethyl-1-aminobenzene or 4-ethoxy-1-aminobenzene.

There may also be used 1-hydroxy-2-aminobenzene carboxylic acid amides containing sulfonic acid groups, for example, those containing as a substituent at the nitrogen atom an aryl radical containing a sulfonic acid group.

Such compounds can be made by sulfonating the corresponding ortho-hydroxy-nitro-compounds free from sulfonic acid groups, and reducing the nitro group in the resulting product to the amino group, or by condensing the appropriate 1-hydroxy-2-nitrobenzene carboxylic acids or their halides with arylamines containing sulfonic acid groups, and reducing the nitro group in the resulting product to the amino group.

A number of 1-hydroxy-2-aminobenzene carboxylic acid amides are known (see, for example, U. S. Patent No. 2,467,621).

Among the 8-hydroxyquinolines, which are to be coupled by the process of the invention with the diazo compounds of the amino-monoazo-dyestuffs, 8-hydroxyquinoline itself is of special value. However, there may be used substituted 8-hydroxyquinolines, such, for example, as 5-chloro-8-hydroxyquinoline or 8-hydroxyquinoline-7-sulfonic acid.

The diazotization of the amino-monoazo-dyestuffs of the Formula 2 can be carried out by the ordinary known methods, for example, with the aid of hydrochloric acid and sodium nitrite. The coupling of the diazotized amino-monoazo-dyestuffs with the 8-hydroxyquinolines is advantageously carried out in an alkaline medium for example a medium rendered alkaline with an alkali carbonate or an alkali hydroxide. When the 8-hydroxyquinolines are free from groups imparting solubility such as sulfonic acid groups, it is generally desirable to bring them into a form well suited for coupling by first dissolving them in water in the form of the hydrochloride, mixing the resulting solution with the diazotization mixture and then adding an excess of alkali.

The disazo dyestuffs of this invention, and corresponding to the foregoing general Formula 1, especially those which correspond to the formula (3)
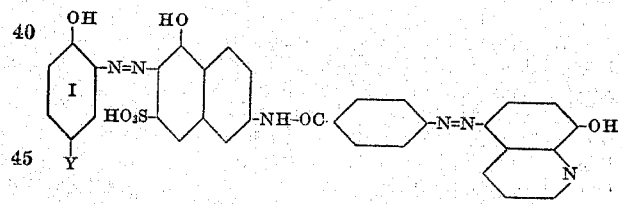

in which Y represents a carboxylic acid amide group bound to the benzene nucleus I by its —CO— group, are suitable for dyeing or printing a very wide variety of materials, for example animal fibers such as wool, silk and leather, but especially for dyeing and printing cellulose materials such as cotton, linen, and artificial silk and staple fibers of regenerated cellulose. The dyestuffs may be converted in substance, in the dyebath or on the fiber into complex metal compounds, for example, copper, chromium, iron, nickel or cobalt compounds. Conversion into such complex metal compounds is carried out by methods in themselves known in an acid, neutral or alkaline medium, under atmospheric or superatmospheric pressure, with or without additions such as salts of inorganic or organic acids such as tartaric acid, acid-binding agents or agents capable of favoring the formation of complexes, such as pyridine. It is especially useful to prepare the metal compounds, more particularly the copper compounds, on a substratum when the metal free dyestuffs exhibit too low a degree of affinity and/or when the metalliferous dyestuffs are still sufficiently soluble. Thus, in the case of dyestuffs yielding sparingly soluble metal compounds, they may be treated, for example, advantageously on the fiber or partially on the fiber and partially in the dyebath by known methods with agents yielding metal. It is of advantage to use, for example, the process of U. S. Patent No. 2,148,659 in which first the dyeing and then the treatment with an agent yielding metal are carried out in the same bath. As agents yielding metal there come into consideration especially those which are stable towards alkaline solutions, such as complex copper tartrates and the like.

In many cases especially valuable dyeings can be produced by using the process in which the dyeings or prints produced with the metal-free dyestuffs are after-treated with aqueous solutions which contain a basic formaldehyde condensation product of a compound which contains at least once the atomic grouping

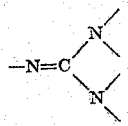

or a substance, for example, cyanamide, which is readily convertible into such a compound, and also contains a water-soluble copper compound, especially a complex copper compound. Processes of this kind are described for example, in British Patent No. 619,969.

The after-coppered dyeings made on cellulosic fibers with the dyestuffs corresponding to the Formula 1 and especially with those corresponding to the Formula 3 as a rule possess very good fastness properties, particularly a good fastness to light and to washing.

The following examples illustrate the invention, the parts and percentages being by weight:

Example 1

22.8 parts of 1-hydroxy-2-aminobenzene-4-carboxylic acid phenylamide are diazotized at 0° C. with the addition of 6.9 parts of sodium nitrite and 27 parts of hydrochloric acid of 30 per cent. strength, and the diazo compound is coupled with 35.8 parts of 2-(4'-aminobenzoyl)-amino-5-hydroxynaphthalene-7-sulfonic acid in a medium rendered alkaline with sodium carbonate.

The amino-monoazo-dyestuff is precipitated with sodium chloride, separated by filtration and pressed, and is then stirred in 400 parts of water with the addition of 7 parts of sodium nitrite and the resulting suspension is cooled to 5° C. The whole is then mixed with 30 parts of hydrochloric acid of 30 per cent. strength and stirred for about 2 hours. The resulting diazo compound is mixed with a solution of 14.5 parts of 8-hydroxyquinoline and 12 parts of hydrochloric acid of 30 per cent. strength in 50 parts of water. 50 parts of sodium hydroxide solution of 30 per cent. strength are then added, and the whole is stirred for a few hours, then heated up to 65° C. 100 parts of sodium chloride are added in order to obtain the product in a well filterable form, and the precipitate is separated by filtration and dried.

There is obtained a dark brown powder soluble with a violet coloration in concentrated sulfuric acid and with a red coloration in dilute alkalies, which dyes cotton and regenerated cellulose by the single-bath or 2-bath after-coppering process red tints of very good fastness to washing and light.

Instead of 1 - hydroxy - 2 - aminobenzene - 4 - carboxylic acid phenylamide there may be used as initial component 1 - hydroxy - 2 - aminobenezene - 4 - carboxylic acid (2'-chlorophenylamide), 1-hydroxy-2-aminobenzene-4-carboxylic acid naphthyl-(2')-amide or 1-hydroxy-2-aminobenzene-4-carboxylic acid-β-hydroxyethylamide.

Example 2

In 100 parts of fuming sulfuric acid containing 24 per cent. of free $SO_3$ there are introduced in portions, while stirring well, 51.6 parts of 2-nitro-1-hydroxybenzene-4-carboxylic acid phenylamide. Care is taken by external cooling to prevent the temperature rising above 25° C. When the addition is complete, the whole is stirred for a further 30 minutes and poured on to ice. Then, a quantity of sodium hydroxide solution is added sufficient to give the reaction mixture a weakly acid reaction, and the product sulfonated in the phenylamide radical is separated by filtration. By reduction of the Béchamp-Brimmeyr method with iron and a small amount of acetic acid an almost colorless product is obtained which may be recrystallized from alcohol of 70 per cent. strength.

30.8 parts of the sulfonated and reduced product are diazotized indirectly by dissolving that amount of the product together with 5.5 parts of sodium carbonate in 1500 parts of water, mixing the whole with 6.9 parts of sodium nitrite, and running in 40 parts of hydrochloric acid of 30 per cent. strength and 200 parts of water at 0-5° C. After about 3 hours the diazotization is complete. For the purpose of coupling the diazo suspension is mixed with 35.8 parts of 2-(4'-aminobenzoyl)-amino-5-hydroxy-naphthalene-7-sulfonic acid in a medium rendered alkaline with sodium carbonate.

The resulting monoazo-dyestuff is separated, diazotized and coupled with 8-hydroxyquinoline in the manner described in the second paragraph of Example 1.

The new dyestuff dyes cotton and regenerated cellulose by the single bath or 2-bath after-coppering process somewhat purer tints than the dyestuff described in Example 1. In other respects its properties corresponds to those of the dyestuff of Example 1.

Example 3

15.2 parts of 1-hydroxy-2-aminobenzene-4-carboxylic acid amide are converted in the usual manner with hydrochloric acid and sodium nitrite into the diazo compound. The latter is then coupled with a solution of 35.8 parts of 2-(4'-aminobenzoyl)-amino-5-hydroxynaphthalene-7-sulfonic acid and 30 parts of sodium carbonate in 500 parts of water.

The amino-monoazo-dyestuff is precipitated with sodium chloride, separated by filtration and pressed, and is then diazotized in 400 parts of water with hydrochloric acid and sodium nitrite in known manner. The diazo-mono-azo-compound is then coupled with 8-hydroxyquinoline to form the disazo-dyestuff as described in the second paragraph of Example 1.

The separated and dried dyestuff is a dark brown powder which dissolves in water with a red coloration. It dyes cotton and regenerated cellulose by the single bath or 2-bath after-coppering process yellowish red tints of very good fastness to light.

Example 4

24.2 parts of 1-hydroxy-2-aminobenzene-4-carboxylic acid-N-methyl-phenylamide are converted in known manner with the addition of 6.9 parts of sodium nitrite and 27 parts of hydrochloric acid of 30 per cent. strength into the diazo compound, and the latter is coupled with 35.8 parts of 2-(4'-aminobenzoyl)-amino-5-hydroxynaphathalene-7-sulfonic acid in a medium rendered alkaline with sodium carbonate.

After 12 hours, the dyestuff so obtained is precipitated with sodium chloride, separated by filtration and thoroughly pressed. The filter residue is stirred in 700 parts of water with the addition of 7 parts of sodium nitrite, and the resulting suspension is cooled to 5° C. There are then added 30 parts of hydrochloric acid of 30 per cent. strength and the whole is stirred for about 2 hours. The diazo compound so obtained is then mixed with a solution of 14.5 parts of 8-hydroxyquinoline and 12 parts of hydrochloric acid of 30 per cent. strength in 50 parts of water. 50 parts of an ammonia solution of 20 per cent. strength are then run in, and the whole is stirred for a few hours longer. The mixture is then heated up to 65° C., 100 parts of sodium chloride are added, and the precipitate is separated by filtration and dried.

There is obtained a dark brown powder which dissolves in dilute alkalies with a red coloration, and dyes cotton and regenerated cellulose by the single bath or 2-bath after-coppering process red tints of very good fastness to washing and acid.

*Example 5*

100 parts of cotton are entered at 50° C. into a dyebath containing in 4000 parts of water 2 parts of anhydrous sodium carbonate and 1 part of the dyestuff obtainable as described in the first and second paragraphs of Example 1. The temperature is slowly raised to the boil, 30 parts of crystalline sodium sulfate are added, and dyeing is carried on for ¾ hour at about 95° C. The bath is then allowed to cool to about 70° C., 1 part of complex sodium-copper tartrate is added, the goods are worked for ½ hour at about 80° C., and then rinsed with cold water. There is obtained a red dyeing of very good fastness to washing and light.

What we claim is:

The disazo dyestuff of the formula

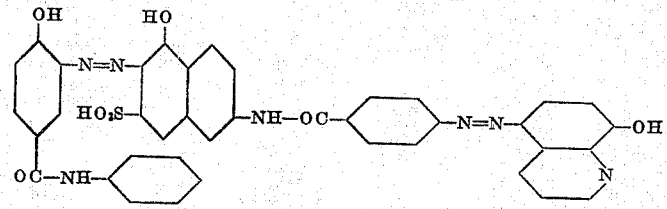

References Cited in the file of this patent

UNITED STATES PATENTS

| | | |
|---|---|---|
| 2,353,675 | Knecht | July 18, 1944 |
| 2,387,987 | Felix | Oct. 30, 1945 |
| 2,411,646 | Anderau | Nov. 26, 1946 |
| 2,467,621 | Kaiser | Apr. 19, 1949 |